United States Patent [19]

Kuroda et al.

[11] Patent Number: 5,747,681
[45] Date of Patent: May 5, 1998

[54] COMBUSTION STATE-DETECTING SYSTEM FOR INTERNAL COMBUSTION ENGINES

[75] Inventors: Shigetaka Kuroda; Yuichi Shimasaki, both of Wako, Japan

[73] Assignee: Honda Giken Kogyo Kabushiki Kaisha, Tokyo, Japan

[21] Appl. No.: 801,926

[22] Filed: Feb. 14, 1997

Related U.S. Application Data

[63] Continuation of Ser. No. 322,506, Oct. 14, 1994, abandoned.

[30] Foreign Application Priority Data

Oct. 15, 1993 [JP] Japan ................ 5-282024

[51] Int. Cl.$^6$ ........................... G01M 15/00
[52] U.S. Cl. ........................... 73/117.3
[58] Field of Search ................ 73/116, 117.3; 123/419, 436; 364/431.07, 431.08

[56] References Cited

U.S. PATENT DOCUMENTS

| | | | |
|---|---|---|---|
| 4,691,286 | 9/1987 | Obayashi et al. | 364/431.08 |
| 4,932,379 | 6/1990 | Tang et al. | 73/117.3 |
| 5,041,980 | 8/1991 | Maddock et al. | 73/116 |
| 5,044,195 | 9/1991 | James et al. | 73/117.3 |
| 5,111,405 | 5/1992 | Maeda et al. | 73/116 |
| 5,165,271 | 11/1992 | Stepper et al. | 73/116 |
| 5,241,480 | 8/1993 | Takaku et al. | 364/431.08 |
| 5,245,866 | 9/1993 | Hashiguchi et al. | 73/117.3 |
| 5,263,364 | 11/1993 | Nakayama et al. | 364/431.07 |
| 5,263,453 | 11/1993 | Wakahara et al. | 73/117.3 |
| 5,361,629 | 11/1994 | McCombie | 73/117.3 |
| 5,373,732 | 12/1994 | Kuroda et al. | 73/117.3 |
| 5,379,634 | 1/1995 | Kuroda et al. | 73/116 |

Primary Examiner—George M. Dombroske
Assistant Examiner—Eric S. McCall
Attorney, Agent, or Firm—Nikaido Marmelstein Murray & Oram LLP

[57] ABSTRACT

A combustion state-detecting system for internal combustion engines has a crank angle sensor which generates a crank angle signal with a predetermined period shorter than the firing period of the engine whenever the crankshaft rotates through a predetermined angle. A value of the rotational speed of the engine is detected whenever the crank angle signal is generated. An average value of the detected engine rotational speed is calculated over every period of one rotation of the crankshaft. A difference amount between a newest value of the average value of the detected engine rotational speed and a value of the average value calculated a predetermined number of firing periods earlier is calculated. The combustion state of the engine is detected based on the difference amount.

15 Claims, 11 Drawing Sheets

COMBUSTION STATE-DETECTING SYSTEM FOR INTERNAL COMBUSTION ENGINES

This application is a continuation of application Ser. No. 08/322,506 filed Oct. 14, 1994, now abandoned.

BACKGROUND OF THE INVENTION

1. Field of the Invention

This invention relates to a combustion state-detecting system for detecting a state of combustion (misfiring) in internal combustion engines, based upon a variation in the angular velocity of the crankshaft during rotation of the engine in every combustion cycle.

2. Prior Art

A combustion state-detecting system for an internal combustion engine has already been proposed by the present assignee in U.S. Ser. No. 08/126,832 (corresponding to Japanese Provisional Patent Publication (Kokai) No. 6-101560) which is adapted to detect a rate of variation in the angular velocity of the crankshaft during rotation of the engine in every combustion cycle, and determine the combustion state of the engine, based upon the detected rate of variation. According to the combustion state-detecting system, to eliminate high-frequency noise components from a signal indicative of the rotational speed of the engine detected per rotation of the crankshaft through 30 degrees, averaging processing (low-pass filter processing) of the engine rotational speed represented by the signal is performed, and then, to eliminate low-frequency noise components from the resulting signal, high-pass filter processing is performed on the averaged rotational speed per each TDC signal pulse generated. An amount of variation in the resulting averaged rotational speed is calculated per each TDC signal cycle. Further, a difference between a value of the amount of variation averaged over a predetermined number of firing periods and the amount of variation is calculated. It is determined that the combustion state of the engine is degraded when a cumulative value of the difference exceeds a predetermined value.

However, the high-pass filter processing performed by the proposed system cannot achieve sufficient filtering effects due to a low sampling frequency employed, and particularly, it cannot sufficiently attenuate a reactionary vibration component (frequency components substantially equal to a 0.25th order of the engine rotational speed (i.e. frequency components substantially equal to a frequency which is 0.25 times as high as the frequency of rotation of the engine)) resulting from occurrence of a misfire. That is, the above high-pass filter processing cannot sufficiently attenuate frequency components lower than a 0.5th order of rotation of the engine.

As a result, a reactionary vibration resulting from occurrence of a single or sporadic misfire can lead to an erroneous determination that a multiple misfire has occurred, i.e. a plurality of misfires have occurred in two or more cylinders. Further, even when the engine is in a normal combustion state, attenuation of frequency components ascribed to road surface-dependent vibrations of an automotive vehicle can be insufficient when the vehicle is traveling on a rough road, resulting in an erroneous determination as to occurrence of a misfire.

SUMMARY OF THE INVENTION

It is the object of the invention to provide a combustion state-detecting system for an internal combustion engine,

2 which is capable of sufficiently attenuating low-frequency noise components contained in a signal indicative of variation in the rotation of the engine, to thereby more accurately detect occurrence of a misfire.

To attain the above object, the present invention provides a combustion state-detecting system for an internal combustion engine having at least one spark plug, and a crankshaft, comprising:

crank angle signal-generating means for generating a crank angle signal with a predetermined period shorter than a firing period of the spark plug whenever the crankshaft rotates through a predetermined angle;

engine speed-detecting means for detecting a value of rotational speed of the engine whenever the crank angle signal is generated;

averaging means for continuously averaging values of the rotational speed of the engine detected by the engine speed-detecting means, over a period of one rotation of the crankshaft, to obtain an average value;

difference amount-calculating means for calculating a difference amount between a value of the average value calculated by the averaging means and a value of the average value calculated by the averaging means a predetermined number of firing periods earlier; and combustion state-detecting means for detecting a combustion state of the engine based on the difference amount.

Preferably, the combustion state-detecting system includes difference amount-averaging means for averaging the difference amount over a period corresponding to a predetermined number of firing periods to obtain an averaged difference amount, and the combustion-state detecting means detects the combustion state of the engine based on the averaged difference amount.

Preferably, the difference amount-calculating means calculates the difference amount between a value of the average value calculated by the averaging means and a value of the average value calculated by the averaging means one firing period earlier.

Alternatively, the difference amount-calculating means calculates the difference amount between a value of the average value calculated by the averaging means and a value of the average value calculated by the averaging means a number of firing periods earlier, which corresponds to one rotation of the crankshaft.

Also alternatively, the difference amount-calculating means has first difference amount-calculating means for calculating the difference amount between a value of the average value calculated by the averaging means and a value of the average value calculated by the averaging means one firing period earlier, second difference amount-calculating means for calculating the difference amount between a value of the average value calculated by the averaging means and a value of the average value calculated by the averaging means a number of firing periods earlier, which corresponds to one rotation of the crankshaft, and selecting means for selecting one of the first difference amount-calculating means and the second difference amount-calculating means for operation, depending on the rotational speed of the engine.

Preferably, the combustion state-detecting system according to the invention may include determining means for determining that the engine is in a degraded combustion state when the averaged difference amount exceeds a predetermined reference value set according to the rotational speed of the engine and load on the engine.

In a further aspect of the invention, there is provided a combustion state-detecting system for an internal combustion engine having at least one spark plug, and a crankshaft, comprising:

crank angle signal-generating means for generating a crank angle signal with a predetermined period shorter than a firing period of the spark plug whenever the crankshaft rotates through a predetermined angle;

engine speed-detecting means for detecting a value of rotational speed of the engine whenever the crank angle signal is generated;

averaging means for averaging values of the rotational speed of the engine detected by the engine speed-detecting means, over a period of one rotation of the crankshaft, to obtain an average value;

difference amount-calculating means for calculating a difference amount between a value of the average value calculated by the averaging means and a value of the average value calculated by the averaging means a predetermined number of firing periods earlier;

difference amount-cumulating means for cumulating the difference amount over a period corresponding to a predetermined number of firing periods to obtain a cumulative difference amount; and combustion state-detecting means for detecting a combustion state of the engine based on the cumulative difference amount.

Preferably, the difference amount-calculating means calculates the difference amount between a value of the average value calculated by the averaging means and a value of the average value calculated by the averaging means one firing period earlier.

Alternatively, the difference amount-calculating means calculates the difference amount between a value of the average value calculated by the averaging means and a value of the average value calculated by the averaging means a number of firing periods earlier, which corresponds to one rotation of the crankshaft.

Also alternatively, the difference amount-calculating means has first difference amount-calculating means for calculating the difference amount between a value of the average value calculated by the averaging means and a value of the average value calculated by the averaging means one firing period earlier, second difference amount-calculating means for calculating the difference amount between a value of the average value calculated by the averaging means and a value of the average value calculated by the averaging means a number of firing periods earlier, which corresponds to one rotation of the crankshaft, and selecting means for selecting one of the first difference amount-calculating means and the second difference amount-calculating means for operation, depending on the rotational speed of the engine.

Preferably, the combustion state-detecting system according to the invention may include determining means for determining that the engine is in a degraded combustion state when the cumulative difference amount exceeds a predetermined reference value set according to the rotational speed of the engine and load on the engine.

The above objects, features, and advantages of the invention will be more apparent from the following detailed description taken in conjunction with the accompanying drawings.

BRIEF DESCRIPTION OF THE DRAWINGS

FIG. 2A and FIG. 2B are flowcharts showing programs (main routines) for determining a state of combustion of the engine, in which:

DETAILED DESCRIPTION

The invention will now be described in detail with reference to the drawings showing embodiments thereof.

Figure 1:
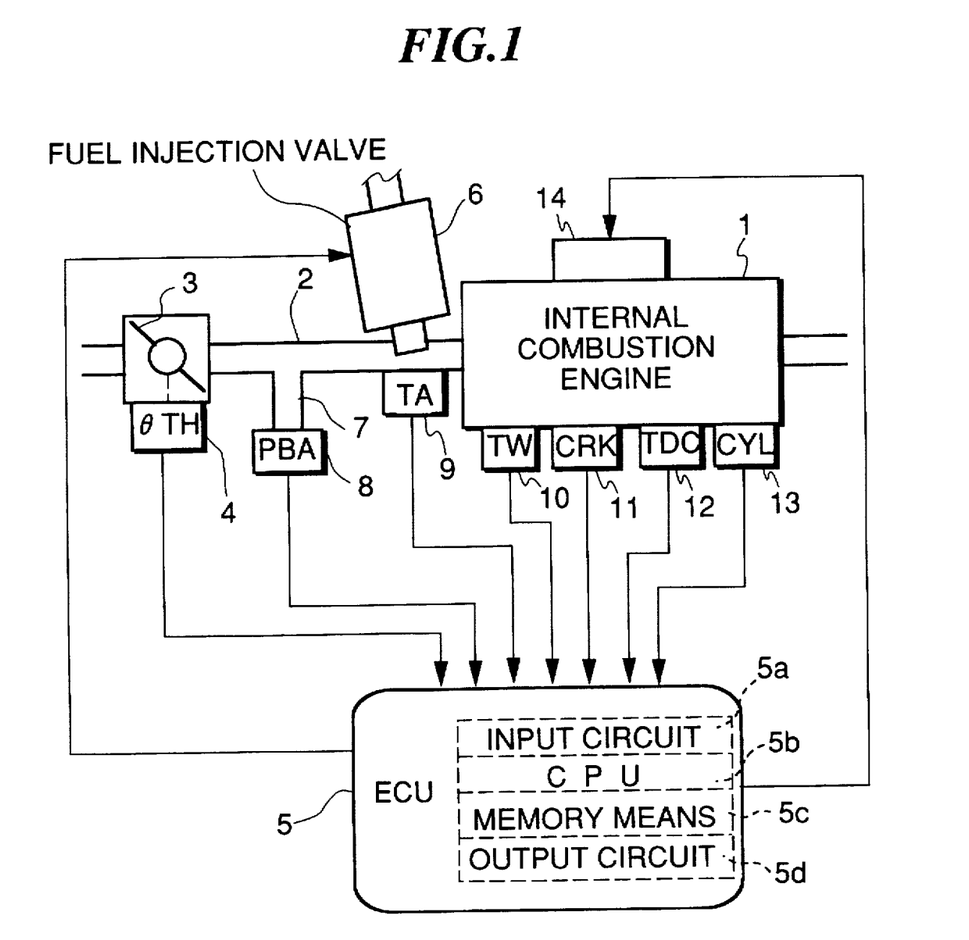
FIG. 1 is a block diagram showing the whole arrangement of an internal combustion engine incorporating a combustion state-detecting system according to an embodiment of the invention.

Referring first to FIG. 1, there is shown the whole arrangement of an internal combustion engine incorporating a combustion state-detecting system according to an embodiment of the invention. In an intake pipe 2 of the engine 1, there is arranged a throttle valve 3, to which is connected a throttle valve opening (ΔTH) sensor 4 for generating an electric signal indicative of the sensed throttle valve opening and supplying the same to an electronic control unit (hereinafter referred to as "the ECU") 5.

Fuel injection valves 6 are provided for each cylinder and arranged in the intake pipe 2 at a location between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3 for supplying an electric signal indicative of the sensed absolute pressure to the ECU 5. An intake air temperature (TA) sensor 9 is inserted into the intake pipe 2 at a location downstream of the intake pipe absolute pressure sensor 8 for supplying an electric signal indicative of the sensed intake air temperature TA to the ECU 5.

An engine coolant temperature (TW) sensor 10, which may be formed of a thermistor or the like, is mounted in the cylinder block of the engine 1 for supplying an electric signal indicative of the sensed engine coolant temperature TW to the ECU 5.

A cylinder-discriminating sensor (hereinafter referred to as "the CYL sensor") 13, a top dead point (TDC) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at predetermined crank angles of a particular cylinder of the engine 1. These sensors 11 to 13 are formed of a magnetic pickup or a pulser. The TDC sensor 12 generates a TDC signal pulse, at predetermined crank angles (e.g. whenever the crankshaft rotates through 180 degrees when the engine is of the 4-cylinder type) which corresponds to a predetermined crank angle before a top dead point (TDC) of each cylinder corresponding to the start of the intake stroke of the cylinder. The CRK sensor 11 generates a pulse (hereinafter referred to as "a CRK signal pulse") at predetermined crank angles (e.g. whenever the crankshaft rotates through 30 degrees) which corresponds to a repetition period shorter than the repetition period of TDC signal pulses. The CRK signal pulse, TDC signal pulse, and CRK signal (crank angle signal) pulse are supplied to the ECU 5.

Arranged in each cylinder of the engine 1 is a spark plug 14, which is electrically connected to the ECU 5.

The ECU 5 is comprised of an input circuit 5a having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., and an output circuit 5d which outputs driving signals to the fuel injection valves 6 and the spark plugs 14.

The CPU 5b operates in response to signals from the above-mentioned sensors to determine operating conditions in which the engine 1 is operating, and calculates, based upon the determined engine operating conditions, a fuel injection time period of each of the fuel injection valves 6 and ignition timing of each of the spark plugs 14, which are energized in synchronism with TDC signal pulses, to thereby generate driving signals for driving the fuel injection valves 6 and the spark plugs 14 via the output circuit 5d.

Figure 2A:
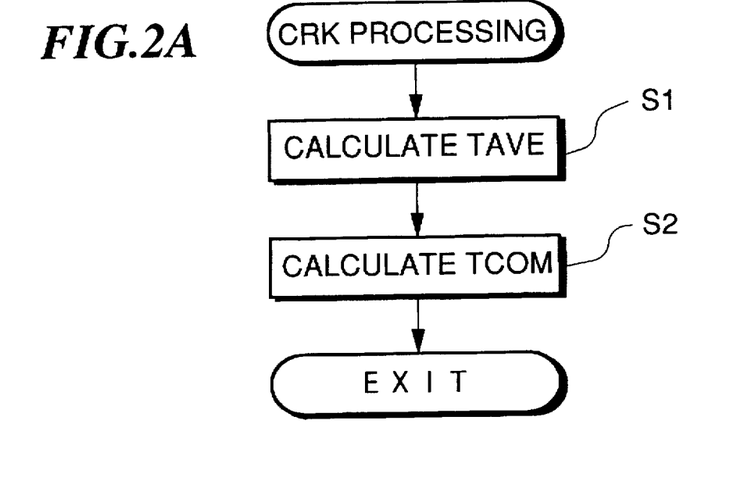
FIG. 2A is a flowchart showing a CRK processing which is executed in synchronism with generation of a crank angle (CRK) signal.
Figure 2B:
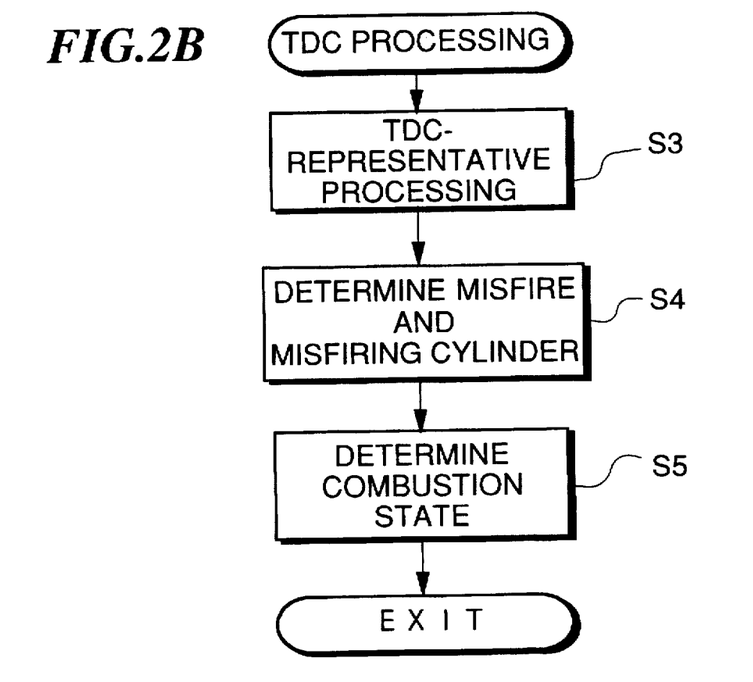
FIG. 2B is a flowchart showing a TDC processing which is executed in synchronism with generation of a top dead center (TDC) signal.

FIG. 2A and FIG. 2B show main routines which are executed by the CPU 5b for determining a state of combustion of the engine 1.

FIG. 2A shows a CRK processing carried out in synchronism with generation of CRK signal pulses. In this processing, at a step S1 of the program, an average value (moving average value) TAVE of time intervals of occurrence of CRK signal pulses is calculated. The time intervals are proportional to the reciprocal of the engine rotational speed. At a step S2, a COM filter processing is executed for calculating a difference amount TCOM between a newest value of the average value TAVE and a value of same obtained one firing period earlier.

FIG. 2B shows a TDC processing carried out in synchronism with generation of TDC signal pulses. In this processing, at a step S3, a TDC-representative value M is calculated from the difference amount TCOM obtained by the CRK processing. At a step S4, a misfire determination and a misfiring cylinder discrimination are carried out based on the TDC-representative value M. Further, an abnormality determination (misfiring determination) is carried out at a step S5 based on the number of times of determination that a misfire has occurred.

Figure 3A:
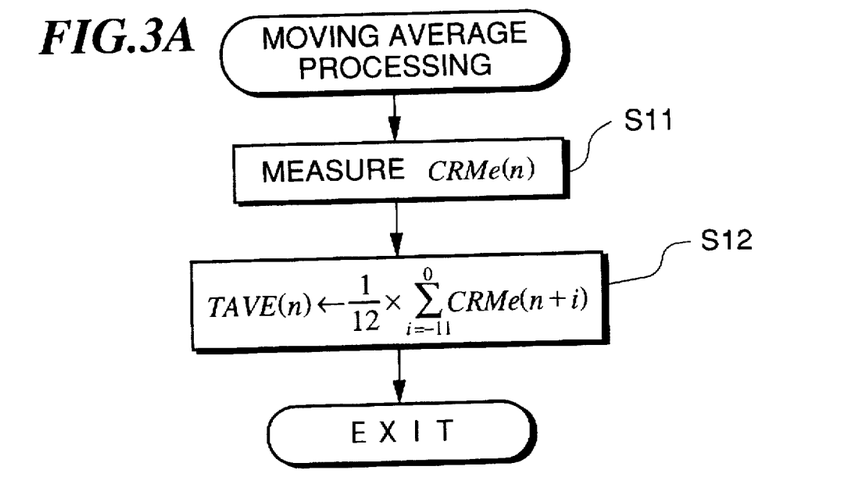
FIG. 3A is a flowchart showing a moving average processing for calculating a moving average value TAVE, which is executed by the FIG. 2A main routine.
Figure 3B:
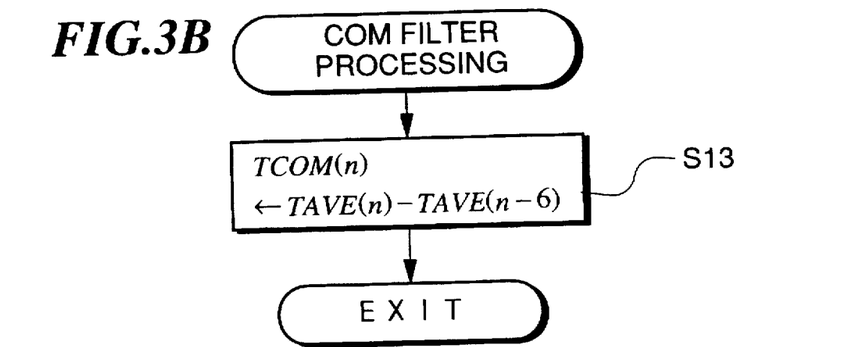
FIG. 3B is a flowchart showing a COM filter processing for calculating a difference amount TCOM (n), which is executed by the FIG. 2A main routine.

FIG. 3A and FIG. 3B show subroutines executed at the steps S1 and S2 of the FIG. 2A routine, respectively.

Figure 5A:
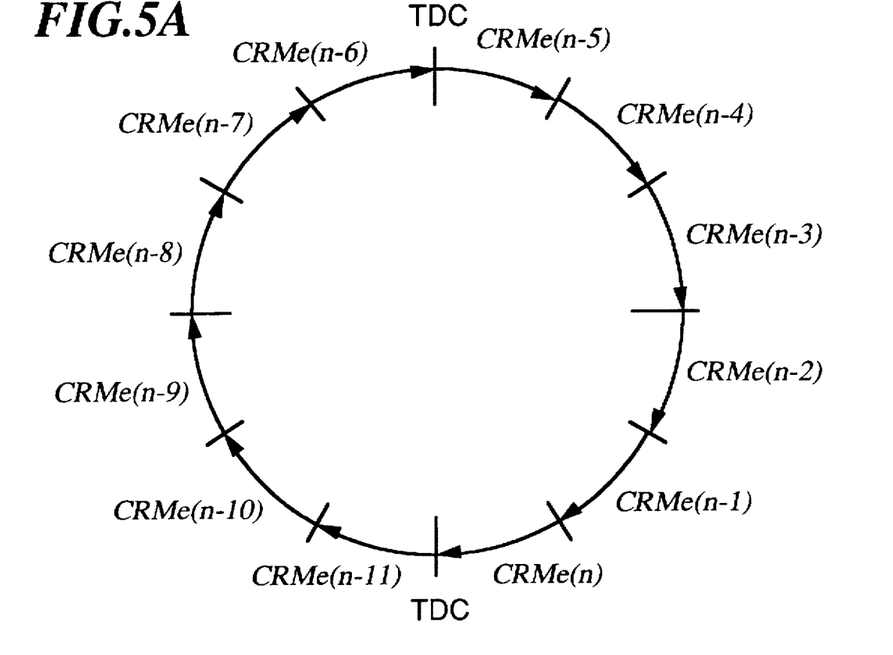
FIG. 5A is a diagram showing the relationship between the time interval CRMe(n) of occurrence of a CRK signal and the rotational angle of the crankshaft.
Figure 5B:
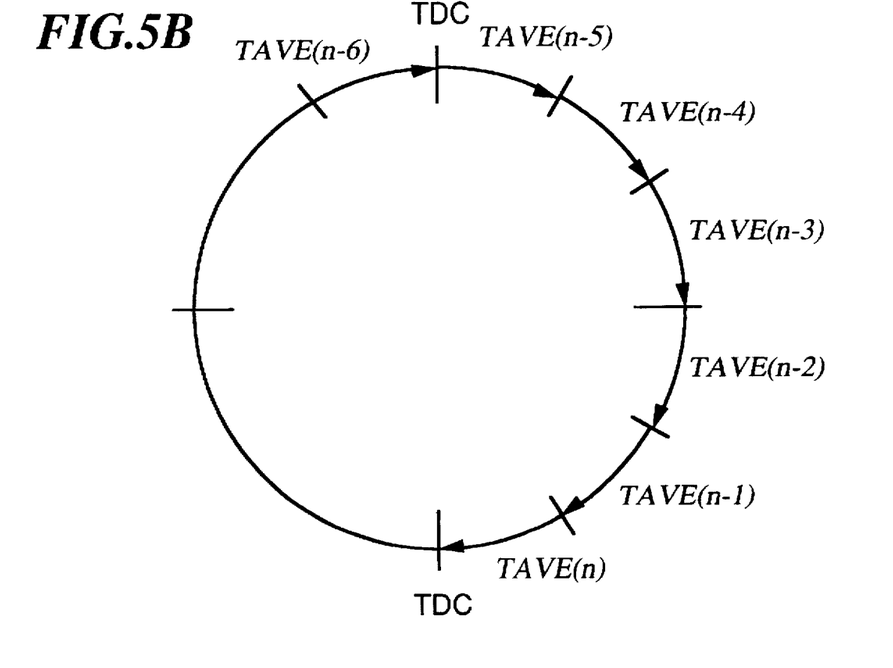
FIG. 5B is a diagram showing the relationship between the moving average value TAVE and the rotational angle of the crankshaft.

Referring first to FIG. 3A, at a step S11, time intervals CRMe(n) of occurrence of CRK signal pulses are calculated. More specifically, time interval values of CRMe(n−11), CRMe(n−10), . . . CRMe(n) are successively measured whenever the crankshaft rotates through 30 degrees, as shown in FIG. 5A.

At a step S12, an average value TAVE(n) is calculated, which is an average value of 12 CRMe values from a value CRMe(n−11) measured eleven loops before the present loop to a value CRMe(n) in the present loop, by the use of the following equation (1):

$$TAVE(n) = 1/12 \times \sum_{i=-11}^{0} CRMe(n+i) \tag{1}$$

Figure 7:
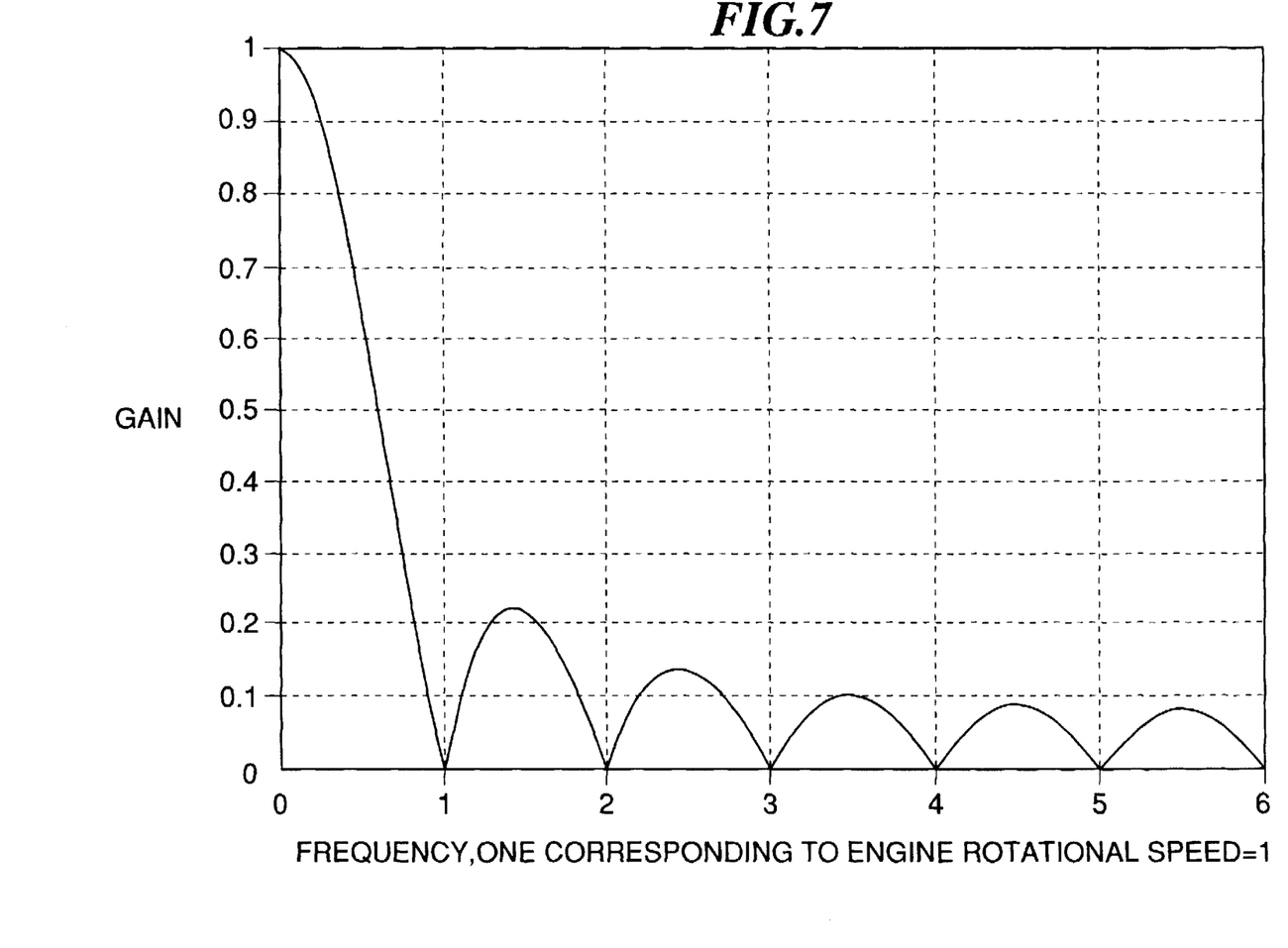
FIG. 7 is a diagram showing a frequency characteristic of the moving average processing executed by the FIG. 3A subroutine.

In the present embodiment, since CRK signal pulses are each generated whenever the crankshaft rotates through 30 degrees, the average value TAVE(n) is an average value obtained over one rotation of the crankshaft. FIG. 7 shows an output frequency characteristic of the averaging processing. As can be understood from the figure, the CRK processing can attenuate a first order frequency component of rotation of the engine, which corresponds to one repetition period of rotation of the crankshaft, and frequency components of N-th orders (N is a natural number) equal to or higher than 2nd order frequency components. Therefore, it is possible to eliminate noise components due to dimensional errors (such as manufacturing tolerances and mounting tolerances) of a pulser or a pickup forming the crank angle sensor 11. The abscissa in FIG. 7 represents frequency, of which a value of 1 corresponds to the rotational speed of the engine.

The engine rotational speed NE is also calculated based on the TAVE(n) value.

Referring next to FIG. 3B, at a step S13, the difference amount TCOM(n) is calculated by the use of the following equation:

$$TCOM(n)=TAVE(n)-TAVE(n-6) \tag{2}$$

where TAVE(n) represents a newest value of the average value TAVE, and TAVE(n−6) represents a value calculated 180 degrees earlier in terms of the rotational angle of the crankshaft. In the present embodiment, the engine 1 is a four-cylinder 4-stroke cycle type, and hence ignition occurs at any one of the cylinders whenever the crankshaft rotates through 180 degrees. Therefore, TAVE(n−6) corresponds to a value calculated one firing period earlier.

Figure 8:
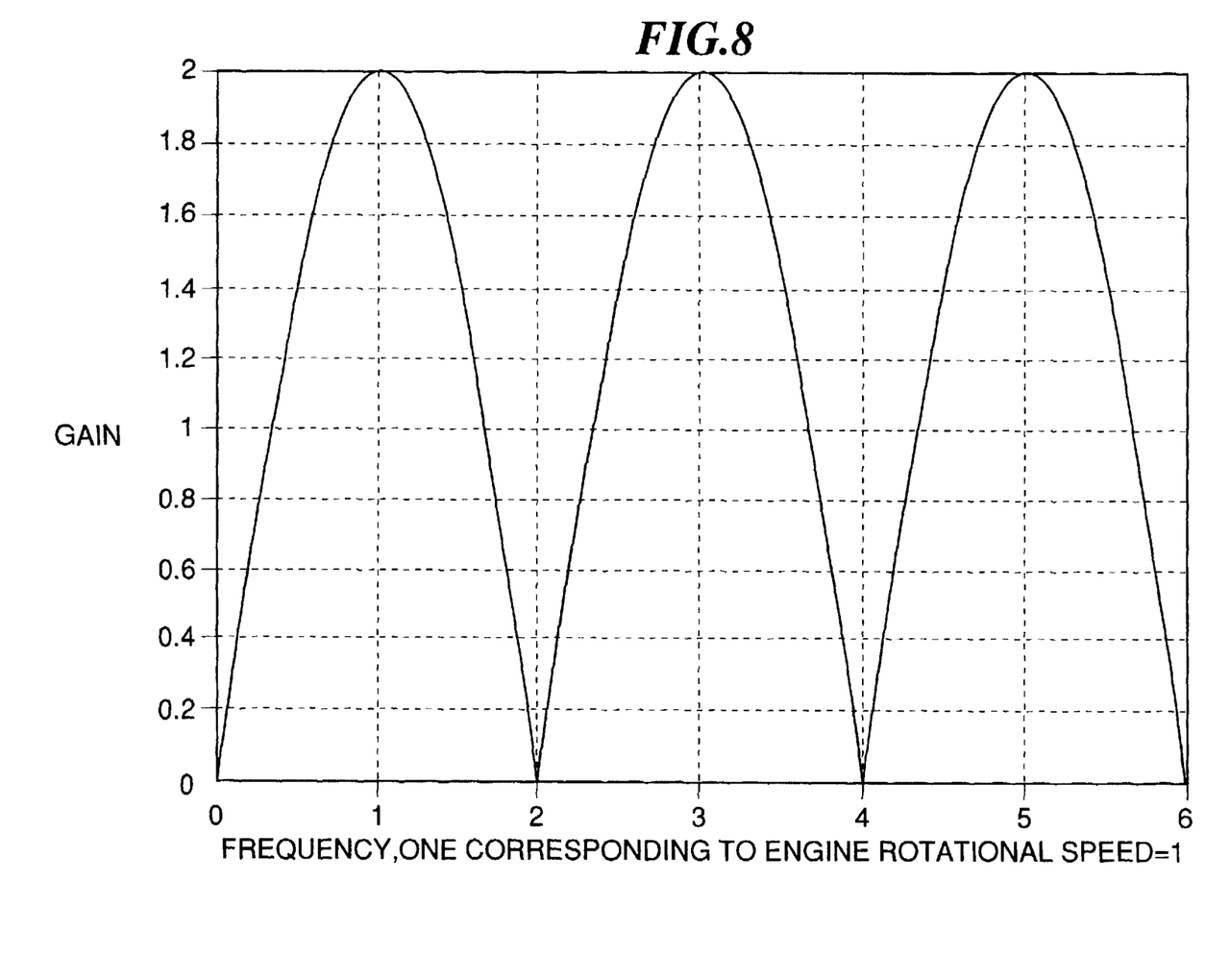
FIG. 8 is a diagram showing a frequency characteristic of the COM filter processing executed by the FIG. 3B subroutine.

FIG. 8 shows a frequency characteristic of a gain (=TCOM(n)/TAVE(n)) of the difference amount TCOM(n) relative to the average value TAVE(n). As can be understood from the figure, this processing can attenuate frequency components of 2×I-th orders (I=0, 1, 2, 3, . . . ) of rotation of the engine.

Figure 9:
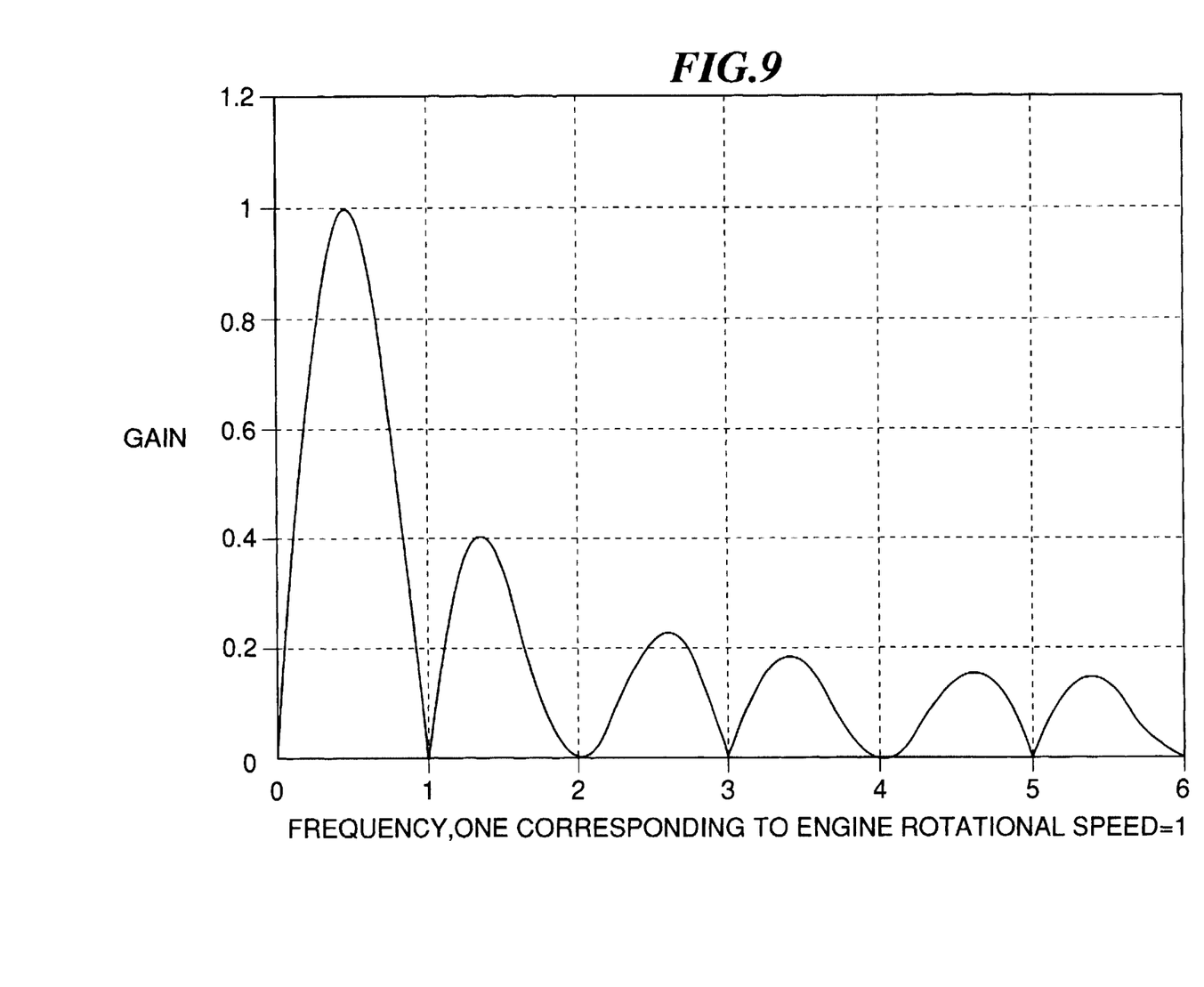
FIG. 9 is a diagram showing a frequency characteristic of a combination of the moving average processing by the FIG. 3A and the COM filter processing by the FIG. 3B subroutine.

FIG. 9 shows a frequency characteristic of a combination of the moving average processing (FIG. 3A) and the COM filter processing (FIG. 3B), whereby it is possible to extract a 0.5th order component of rotation of the engine, while effectively attenuating a 0.25th order component reflecting reactionary vibrations resulting from a misfire. Therefore, a misfire can be determined based on the difference amount TCOM, which prevents a single misfire from being erroneously determined to be a multiple misfire. Further, it is possible to prevent an erroneous detection of misfire due to frequency components ascribed to vibrations of the vehicle traveling on a road surface, when it is traveling on a bad road.

Figure 4A:
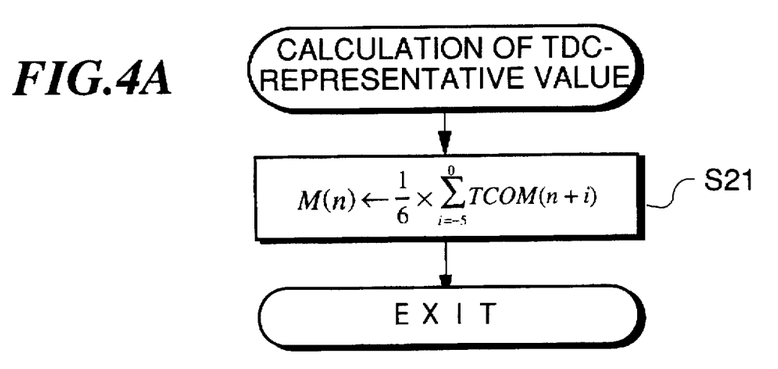
FIG. 4A is a flowchart showing a subroutine for calculating a TDC-representative value M(n), which is executed by the FIG. 2B main routine.
Figure 4B:
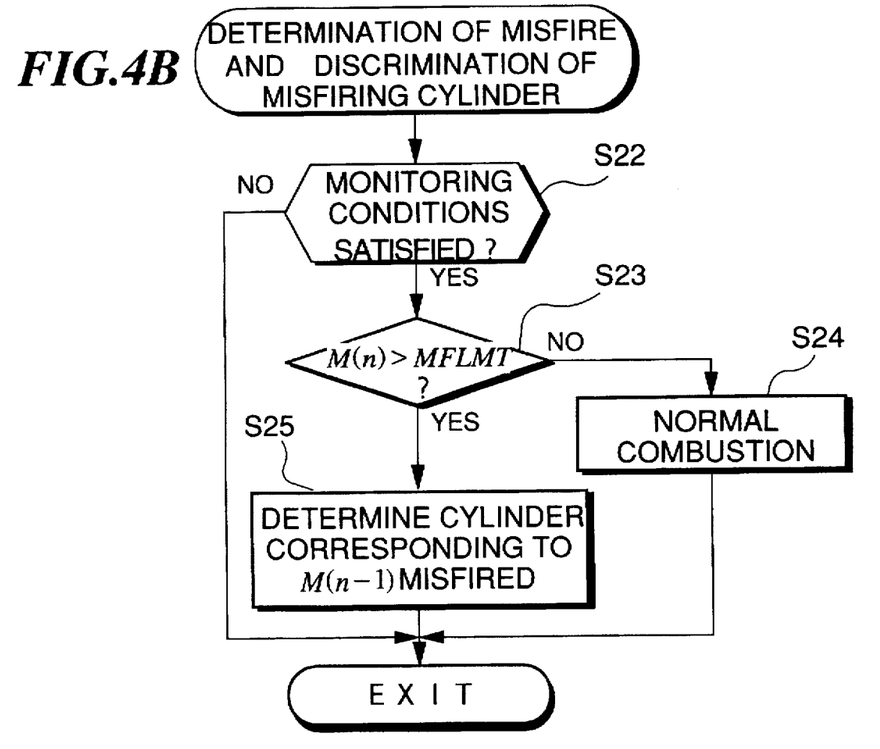
FIG. 4B is a flowchart showing a subroutine for misfire determination and misfiring cylinder discrimination, which is executed by the FIG. 2B main routine.

FIG. 4A and FIG. 4B show subroutines executed at the steps S3 and S4 of the FIG. 2B main routine. At a step S21 of the FIG. 4A routine, the TDC-representative value M(n) is calculated by the use of the following equation (3):

$$M(n) = 1/6 \times \sum_{i=-5}^{0} TCOM(n+i) \quad (3)$$

Figure 6A:
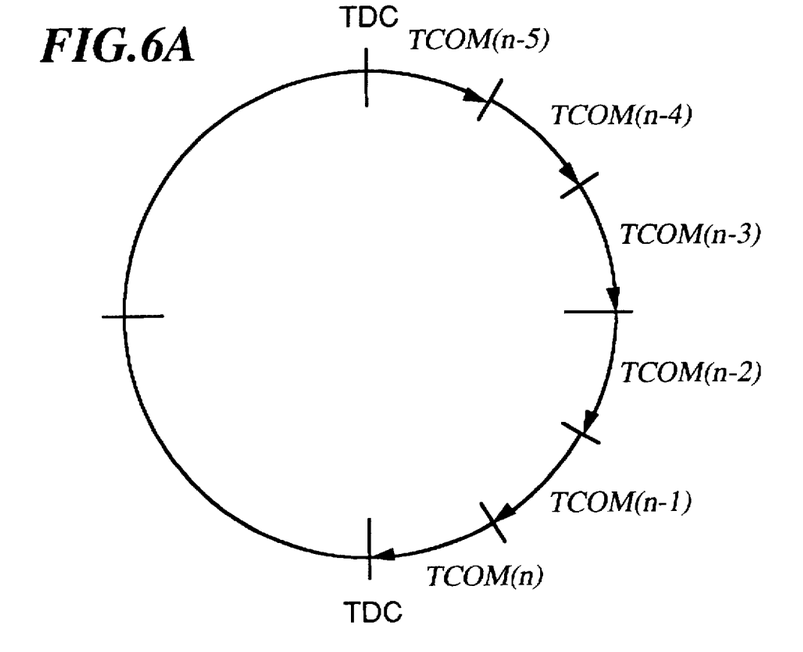
FIG. 6A is a diagram showing the relationship between the difference amount TCOM (n) and the rotational angle of the crankshaft.
Figure 6B:
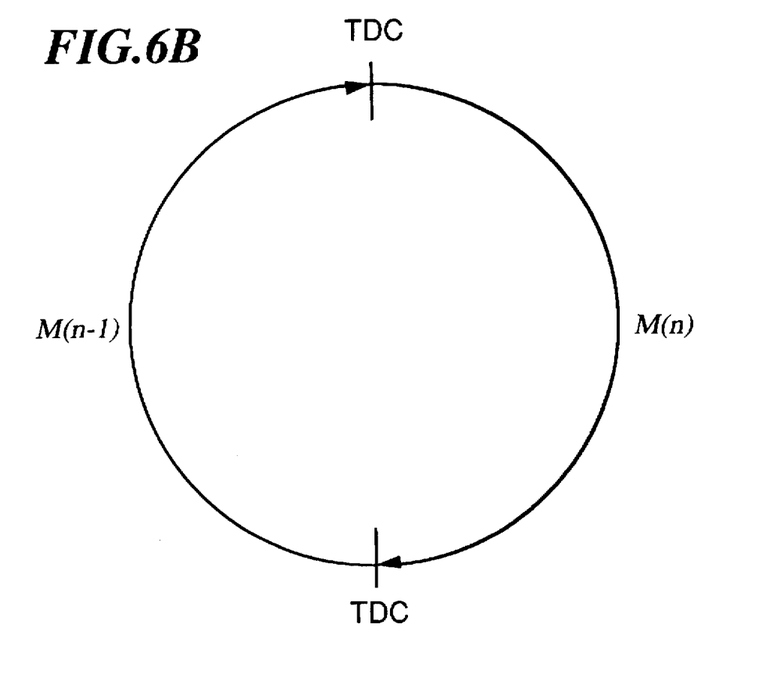
FIG. 6B is a diagram showing the relationship between the TDC-representative value M(n) and the rotational angle of the crankshaft.

The TDC-representative value M(n) calculated by the equation (3) is a value of the difference amount TCOM averaged over a time period corresponding to a rotational angle of 180 degrees passed by the crankshaft, from a time point of generation of the immediately preceding TDC signal pulse to a time point of generation of the present TDC signal pulse, as shown in FIG. 6A and FIG. 6B.

Then, at a step S22 of the FIG. 4B routine, it is determined whether or not monitoring conditions are satisfied, i.e. misfire determination can be carried out. The monitoring conditions are satisfied, for example, when the engine is in a steady operating condition, while at the same time the engine coolant temperature TW the intake air temperature TA, and the engine rotational speed NE, etc. are all within respective predetermined ranges.

If the monitoring conditions are not satisfied, the program is immediately terminated, whereas if the monitoring conditions are satisfied, it is determined at a step S23 whether or not the TDC-representative value M(n) is larger than a predetermined threshold value MFLMT for misfire determination. The predetermined threshold value MFLMT is retrieved from a map, not shown, which is set in accordance with the engine rotational speed NE and the intake pipe absolute pressure PBA (engine load), e.g. such that MFLMT map values are provided at (16×16) lattice points corresponding respectively to combinations of 16 predetermined values of the engine rotational speed NE and 16 predetermined values of the intake pipe absolute pressure PBA. The MFLMT value is set to a smaller value as the engine rotational speed NE increases, and to a larger value as the engine load increases.

If the answer to the question of the step S23 is negative (NO), i.e. if MS<MFLMT is satisfied, it is determined at a step S24 that the combustion is normally performed. On the other hand, if the answer at the step S23 is affirmative (YES), i.e. if MS>MFLMT is satisfied, it is determined at a step S25 that a misfire occurred at a cylinder for which the immediately preceding value M(n−1) of the TOC-representative value was calculated. This determination is based on the fact that when a misfire occurs, the engine rotational speed NE decreases, and hence variation in each of the CRMe, TAVE, and TCOM increases. The misfire is ascribed to the cylinder for which the immediately preceding value M(n−1) of the TDC-representative value was calculated, since delay of filtering processing should be taken into account.

Figure 10:
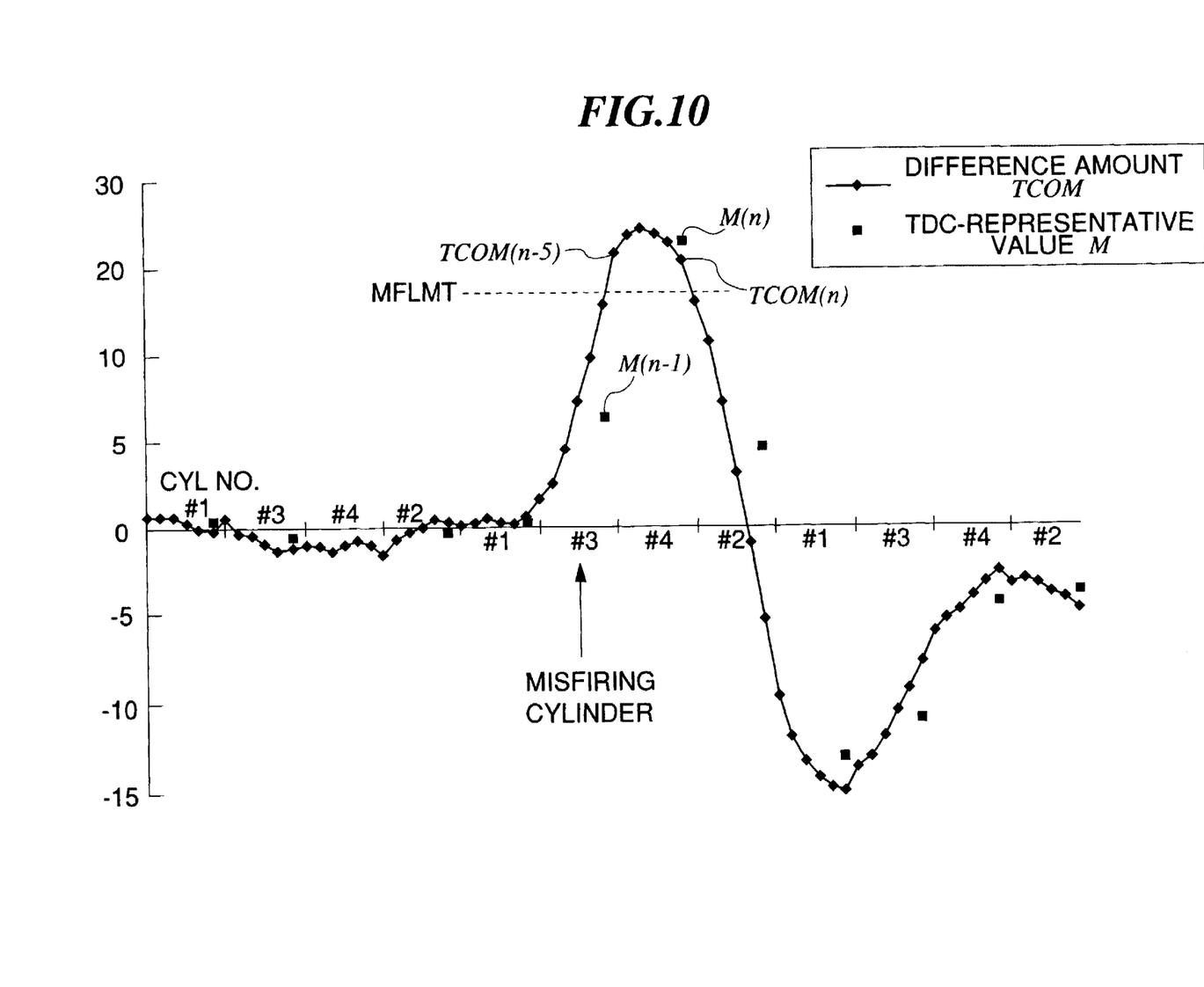
FIG. 10 is a diagram showing changes in the difference amount TCOM(n) and the TDC-representative value M(n) when a single or sporadic misfire has occurred.

FIG. 10 shows changes in the difference amount TCOM and the TDC-representative value M occurring when a single misfire has occurred. A value designated by M(n) in the figure is an average value calculated from six values of TCOM (i.e. TCOM(n−5) to TCOM(n)), and other values of M(n) are calculated in the same manner as described above. In the illustrated example, the value of M(n) exceeds the threshold value MFLMT for misfire determination, and hence it is determined that a misfire occurred at a #3 cylinder for which the immediately preceding value M(n−1) of the TDC-representative value was calculated.

At the step S25 of the FIG. 4B program described above, a count nMFA of a first misfire counter and a count nMFB of a second misfire counter are each incremented by a value of 1. Further, a flag FNFCLYLn (n represents a cylinder number) indicative of a misfiring cylinder is set to a value of 1. The counts NMFA and nNFB of the first and second counters and the flag FMFCYLn are used in a routine shown in FIG. 11. Further, although in the present embodiment, in order to stabilize the accuracy of the misfire determination, the TDC-representative value M obtained by averaging values of the difference amount TCOM is compared with the predetermined threshold value MFLMT, this is not limitative, but the difference amount TCOM may be directly compared with the predetermined threshold value MFLMT for the misfire determination.

Figure 11:
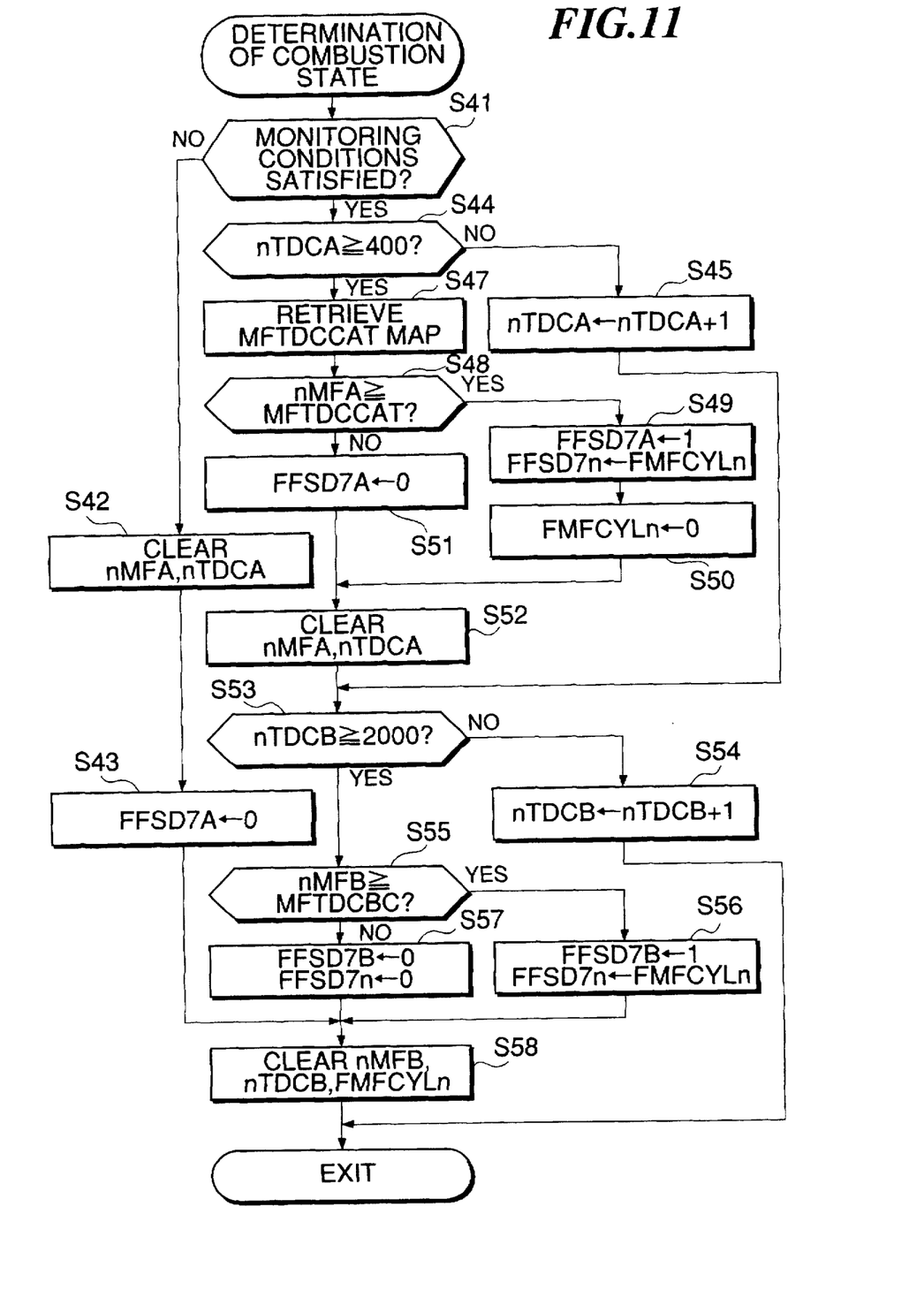
FIG. 11 is a flowchart showing a subroutine for determining a misfiring rate (combustion state) of the engine, which is executed by the FIG. 2B main routine.

FIG. 11 shows the routine for determining a combustion state (misfiring rate) of the engine based on misfires detected in the foregoing steps.

At a step S41, it is determined whether or not monitoring conditions are satisfied in a manner similar to the step S22 of the FIG. 4B subroutine. If the answer to this question is negative (NO), parameters used in the present program are set to respective initial values, at steps S42, S43, and S58, followed by terminating the program.

If the monitoring conditions are satisfied, it is determined at a step S44 whether or not a count nTDCA of a first TDC counter is equal to or larger than 400. If the answer is negative (NO), the count NTDCA is incremented by a value of 1 at a step S45, followed by the program proceeding to a step S53.

If the count nTDCA becomes equal to or larger than 400, the program proceeds to a step S47, where a MFTDCCAT map is retrieved according to the engine rotational speed NE and the intake pipe absolute pressure PBA to thereby determine a first reference value MFTDCCAT for use in determination of a combustion state of the engine. The MFTD-CCAT map is set such that map values correspond to predetermined values of the engine rotational speed NE and predetermined values of the intake pipe absolute pressure PBA.

Then, it is determined at a step S48 whether or not the count nMFA of the first misfire counter, which is incremented at the step S25 of the FIG. 4B routine upon detection of a misfire for counting the number of misfires over 400 ignition cycles, is equal to or larger than the first reference value MFTDCCAT.

When nMFA≧MFTDCCAT is satisfied, it is determined that the engine is in a combustion state adversely affecting component parts of the exhaust system (i.e. a misfiring state), and then the program proceeds to a step S49, where a first abnormality flag FFSD7A is set to a value of 1 to indicate this state of the engine. At the same time, a flag FFSD7n indicative of a misfiring state of each cylinder is updated by the flag FMFCYLn indicative of a misfiring cylinder. Then, at a step S50, the flag FMFCYLn is set to a value of 0. Further, the count nMFA of the first misfire counter and the count nTDCA of the first TDC counter are each set to a value of 0 at a step S52, followed by the program proceeding to a step S53. On the other hand, if nMFA<MFTDCCAT is satisfied, the first abnormality flag FFSD7A is set to a value of 0 at a step S51, followed by the program proceeding to the step S52.

At the step S53, it is determined whether or not the count NTDCB of the second TDC counter is equal to or larger than 2000. If the answer to this question is negative (NO), the count nTDCB is incremnented by a value of 1 at a step S54, followed by terminating the program.

If the count nTDCB becomes larger than 2000, the program proceeds to a step S55, where it is determined whether or not the count nMFB of the second misfire counter, which is incremented at the step S25 of the FIG. 4B routine upon detection of a misfire for counting the number of misfires over 2000 ignition cycles, is equal to or larger than a second reference value MFTDCBC.

If the answer to the question of the step S55 is affirmative (YES), it is determined that the engine is in a combustion state degrading exhaust emission characteristics of the engine (misfiring state), and at a step S56 a second abnormality flag FFSD7B is set to a value of 1 to indicate this state of the engine. At the same time, the flag FFSD7n indicative of a misfiring state of each cylinder is updated by the flag FMFCYLn indicative of a misfiring cylinder. Then, at a step 553, the counts nMFB and nTDCB, and the flag FMFCYLn are each set to a value of 0, followed by terminating the program.

If NMFB<MFTDCBC is satisfied, the second abnormality flag FFSD7B and the flag FFSD7n are each set to a value of 0, and then the program proceeds to the step S58.

As described above, according to the FIG. 11 program, the combustion state adversely affecting the component parts of the exhaust system and one degrading the exhaust emission characteristics can be detected.

Although, in the embodiment described above, the difference amount TCOM is calculated by the use of the equation (2) as a difference between the newest value of the average value TAVE and a value of same detected one firing period earlier, this is not limitative, but the difference amount TCOM may be calculated as a difference between the newest value of TAVE and a value of same calculated one rotation of the crankshaft (two firing periods in the present case) earlier by the use of the following equation (4):

$$TCOM(n)=TAVE(n)-TAVE(n-12) \quad (4)$$

This equation also enables attenuation of the first order component and second order and N-th order components of rotation of the engine, while emphasizing the 0.5th order component to a greater extent than when the equation (2) is applied. However, the degree of attenuation of the 0.25th component is decreased (i.e. the 0.25th component relatively increases). Therefore, it is preferable that the difference amount TCOM is calculated by the use of the equation (2) when the engine is in a low engine rotational speed region susceptible to reactionary vibration resulting from a misfire, while the equation (4) is used when the engine is in a high engine rotational speed region hardly affected by the reactionary vibration.

Further, although the average value TAVE and the TDC-representative value M are calculated by the use of the equations (1) and (3), this is not limitative, but they may be calculated by the use of the following equations (5) and (6) in which the constants $1/12$ and $1/6$ are removed from the respective equations (1) and (3):

$$TAVE(n) = \sum_{i=-11}^{0} CRMe(n+i) \quad (5)$$

$$M(n) = \sum_{i=-5}^{0} TCOM(n+i) \quad (6)$$

When these equations are used, the TAVE value and N value are calculated not as average values but as cumulative values. Since the difference between the two cases is whether respective constants ($1/12$ and $1/6$) for multiplication are used or not, modification of the threshold value MFLMT will enable the misfire detection to be carried out quite in the same manner as in the embodiment described above. Only one of the TAVE value and the m value may be calculated as a cumulative value, with the other as an average value.

Further, although in the above embodiment, the average value or cumulative value (i.e. TDC-representative value) of the difference amount TCOM is calculated by the use of values of the difference amount TCOM obtained during one firing period, this is not limitative, but it may be calculated by the use of TCOM values obtained over 2 firing periods.

What is claimed is:

1. A combustion state-detecting system for an internal combustion engine having at least one spark plug, and a crankshaft, comprising:

crank angle signal-generating means for generating a crank angle signal with a predetermined period shorter than a firing period of said spark plug whenever said crankshaft rotates through a predetermined angle;

engine speed-detecting means for detecting a value of rotational speed of said engine whenever said crank angle signal is generated;

averaging means for continuously averaging values of the rotational speed of said engine which are detected by said engine speed-detecting means whenever said crank angle signal is generated to obtain an average value of rotational speed, over one rotation of the crankshaft at each predetermined angle of said crankshaft;

difference amount-calculating means for calculating a difference amount between an updated value of said average value at one predetermined angle of said crankshaft calculated by said averaging means and a value of said average value calculated by said averaging means at a predetermined angle of said crankshaft corresponding to half a rotation of said crankshaft earlier; and combustion state-detecting means for detecting a combustion state of said engine based on said difference amount.

2. A combustion state-detecting system according to claim 1, including difference amount-averaging means for averaging said difference amount over a period corresponding to a predetermined number of firing periods to obtain an averaged difference amount, and wherein said combustion state-detecting means detects said combustion state of said engine based on said averaged difference amount.

3. A combustion state-detecting system according to claim 1, wherein said difference amount-calculating means calculates said difference amount between a value of said average value calculated by said averaging means and a value of said average value calculated by said averaging means one firing period earlier.

4. A combustion state-detecting system according to claim 1, wherein said difference amount-calculating means calculates said difference amount between a value of said average value calculated by said averaging means and a value of said average value calculated by said averaging means a number of firing periods earlier, which corresponds to one rotation of said crankshaft.

5. A combustion state-detecting system according to claim 1, wherein said difference amount-calculating means has first difference amount-calculating means for calculating said difference amount between a value of said average value calculated by said averaging means and a value of said average value calculated by said averaging means one firing period earlier, second difference amount-calculating means for calculating said difference amount between a value of said average value calculated by said averaging means and a value of said average value calculated by said averaging means a number of firing periods earlier, which corresponds to one rotation of said crankshaft, and selecting means for selecting one of said first difference amount-calculating means and said second difference amount-calculating means for operation, depending on the rotational speed of said engine.

6. A combustion state-detecting system according to claim 2, including determining means for determining that said engine is in a degraded combustion state when said averaged difference amount exceeds a predetermined reference value set according to the rotational speed of said engine and load on said engine.

7. A combustion state-detecting system for an internal combustion engine having at least one spark plug, and a crankshaft, comprising:

crank angle signal-generating means for generating a crank angle signal with a predetermined period shorter than a firing period of said spark plug whenever said crankshaft rotates through a predetermined angle;

engine speed-detecting means for detecting a value of rotational speed of said engine whenever said crank angle signal is generated;

averaging means for averaging values of the rotational speed of said engine which are detected by said engine speed-detecting means whenever said crank angle signal is generated to obtain an average value of rotational speed, over one rotation of the crankshaft, at each predetermined angle of said crankshaft;

difference amount-calculating means for calculating a difference amount between a value of said average value at one predetermined angle of said crankshaft calculated by said averaging means and a value of said average value calculated by said averaging means at a predetermined angle of said crankshaft corresponding to half a rotation of said crankshaft earlier;

difference amount-cumulating means for cumulating said difference amount over a period corresponding to a predetermined number of firing periods to obtain a cumulative difference amount; and combustion state-detecting means for detecting a combustion state of said engine based on said cumulative difference amount.

8. A combustion state-detecting system according to claim 7, wherein said difference amount-calculating means calculates said difference amount between a value of said average value calculated by said averaging means and a value of said average value calculated by said averaging means one firing period earlier.

9. A combustion state-detecting system according to claim 7, wherein said difference amount-calculating means calculates said difference amount between a value of said average value calculated by said averaging means and a value of said average value calculated by said averaging means a number of firing periods earlier, which corresponds to one rotation of said crankshaft.

10. A combustion state-detecting system according to claim 7, wherein said difference amount-calculating means has first difference amount-calculating means for calculating said difference amount between a value of said average value calculated by said averaging means and a value of said average value calculated by said averaging means one firing period earlier, second difference amount-calculating means for calculating said difference amount between a value of said average value calculated by said averaging means and a value of said average value calculated by said averaging means a number of firing periods earlier, which corresponds to one rotation of said crankshaft, and selecting means for selecting one of said first difference amount-calculating means and said second difference amount-calculating means for operation, depending on the rotational speed of said engine.

11. A combustion state-detecting system according to claim 7, including determining means for determining that said engine is in a degraded combustion state when said cumulative difference amount exceeds a predetermined reference value set according to the rotational speed of said engine and load on said engine.

12. A combustion state-detecting system for an internal combustion engine having at least one spark plug, and a crankshaft, comprising:

crank angle signal-generating means for generating a crank angle signal with a predetermined period shorter than a firing period of said spark plug whenever said crankshaft rotates through a predetermined angle;

engine speed-detecting means for detecting a value of rotational speed of said engine whenever said crank angle signal is generated;

averaging means for continuously averaging values of the rotational speed of said engine by said engine speed-detecting means, over a period of one rotation of said crankshaft, to obtain an average value;

difference amount-calculating means for calculating a difference amount between an updated value of said average value calculated by said averaging means and a value of said average value calculated by said averaging means a predetermined number of firing periods earlier; and combustion state-detecting means for detecting a combustion state of said engine based on said difference amount, wherein said difference amount-calculating means has first difference amount-calculating means for calculating said difference amount between a value of said average value calculated by said averaging means and a value of said average value calculated by said averaging means one firing period earlier, second difference amount-calculating means for calculating said difference amount between a value of said average value calculated by said averaging means and a value of said average value calculated by said averaging means a number of firing periods earlier, which corresponds to one rotation of said crankshaft, and selecting means for selecting one of said first difference amount-calculating means and said second difference amount-calculating means for operation, depending on the rotational speed of said engine.

13. A combustion state-detecting system for an internal combustion engine having at least one spark plug, and a crankshaft, comprising:

crank angle signal-generating means for generating a crank angle signal with a predetermined period shorter than a firing period of said spark plug whenever said crankshaft rotates through a predetermined angle;

engine speed-detecting means for detecting a value of rotational speed of said engine whenever said crank angle signal is generated;

averaging means for averaging values of the rotational speed of said engine detected by said engine speed-detecting means, over a period of one rotation of said crankshaft, to obtain an average value;

difference amount-calculating means for calculating a difference amount between a value of said average value calculated by said averaging means and a value of said average value calculated by said averaging means a predetermined number of firing periods earlier;

difference amount-cumulating means for cumulating said difference amount over a period corresponding to a predetermined number of firing periods to obtain a cumulative difference amount; and combustion state-detecting means for detecting a combustion state of said engine based on said cumulative difference amount, wherein said difference amount-calculating means has first difference amount-calculating means for calculating said difference amount between a value of said average value calculated by said averaging means and a value of said average value calculated by said averaging means one firing period earlier, second difference amount-calculating means for calculating said difference amount between a value of said average value calculated by said averaging means and a value of said average value calculated by said averaging means a number of firing periods earlier, which corresponds to one rotation of said crankshaft, and selecting means for selecting one of said first difference amount-calculating means and said second difference amount-calculating means for operation, depending on the rotational speed of said engine.

14. A combustion state-detecting system according to claim 1, wherein said difference amount represents a specific frequency component of rotation of the engine necessary for detecting the combustion state of the engine and for attenuating another specific frequency component which may cause an erroneous determination of a misfire.

15. A combustion state-detecting system according to claim 7, wherein said difference amount represents a specific frequency component of rotation of the engine necessary for detecting the combustion state of the engine and for attenuating another specific frequency component which may cause an erroneous determination of a misfire.

* * * * *